(12) United States Patent
Zierer (10) Patent No.: US 12,209,444 B2
(45) Date of Patent: Jan. 28, 2025

(54) UNIVERSAL LATCH ASSEMBLY TO ALLOW SELECTIVE LATCH HANDLE ORIENTATIONS

(71) Applicant: EMBRAER S.A., São José dos Campos-SP (BR)

(72) Inventor: Rainer Bernd Zierer, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 216 days.

(21) Appl. No.: 17/981,115

(22) Filed: Nov. 4, 2022

(65) Prior Publication Data

US 2023/0167661 A1 Jun. 1, 2023

Related U.S. Application Data

(60) Provisional application No. 63/283,356, filed on Nov. 26, 2021.

(51) Int. Cl.
*E05C 3/16* (2006.01)
*E05B 5/00* (2006.01)
*E05C 1/14* (2006.01)

(52) U.S. Cl.
CPC ............... *E05C 3/162* (2013.01); *E05B 5/00* (2013.01); *E05C 1/14* (2013.01)

(58) Field of Classification Search
CPC . E05C 3/162; E05C 1/14; E05C 9/042; E05C 9/025; E05C 9/045; E05B 5/00;
(Continued)

(56) References Cited

U.S. PATENT DOCUMENTS

| | | | | |
|---|---|---|---|---|
| 298,889 A | * | 5/1884 | Pritchard | E05C 9/045 292/37 |
| 458,730 A | * | 9/1891 | Cole | E05C 9/025 292/DIG. 72 |

(Continued)

FOREIGN PATENT DOCUMENTS

| | | | |
|---|---|---|---|
| CH | 303605 A | * | 7/1952 |
| GB | 191221425 A | * | 9/1912 |

*Primary Examiner* — Christine M Mills
*Assistant Examiner* — Faria F Ahmad
(74) *Attorney, Agent, or Firm* — NIXON & VANDERHYE P.C.

(57) ABSTRACT

Latch assemblies are provided with a paddle lever having an outwardly extending actuator flange and a rotary actuator plate which includes a fixed actuator pin extending outwardly from the actuator plate and adapted to being operatively engaged with the actuator flange of the paddle lever when manually moved into the unlatched condition thereof. At least one pair of arcuate spirally patterned and circumferentially separated cam slots are defined in the rotary actuator plate such that a latch pin associated with a latch bolt is operatively received within a selected one of the cam slots. Movement of the paddle lever from the latched condition into the unlatched condition thereof responsively engages the actuator flange with the actuator pin thereby causing rotation of the actuator plate about a rotary axis thereof and movement of the latch pin within the selected one of the cam slots whereby the latch pin is retracted to unlatch a moveable component from a fixed component.

15 Claims, 9 Drawing Sheets

(58) Field of Classification Search
CPC .... E05B 63/0017; E05B 85/22; E05B 55/005; E05B 55/00; E05B 47/0002; E05B 63/06; E05B 63/04; E05B 65/087; Y10S 292/53; Y10S 292/54; Y10S 292/60; Y10S 292/30; Y10S 292/31; Y10T 292/57
USPC .................. 292/137, 140, 143, 169
See application file for complete search history.

(56) References Cited

U.S. PATENT DOCUMENTS

| | | | | |
|---|---|---|---|---|
| 822,562 | A * | 6/1906 | Tucker | E05C 9/045 292/37 |
| 918,662 | A * | 4/1909 | Drucker | E05C 9/045 292/37 |
| 950,551 | A * | 3/1910 | Ledoux | E05C 9/045 292/37 |
| 956,759 | A * | 5/1910 | Clouse | E05C 9/045 292/37 |
| 997,793 | A * | 7/1911 | Fish et al. | E05C 9/045 292/37 |
| 1,025,923 | A * | 5/1912 | Perry | E05C 9/045 292/37 |
| 1,125,626 | A * | 1/1915 | Young et al. | E05C 9/045 292/37 |
| 1,154,235 | A * | 9/1915 | Cobb | E05C 9/045 27/35 |
| 1,269,572 | A * | 6/1918 | Allenbaugh | E05C 9/045 292/37 |
| 1,635,714 | A * | 7/1927 | Hoffmann | E05C 9/045 292/37 |
| 1,865,205 | A * | 6/1932 | Palmquist | E05C 9/045 292/DIG. 16 |
| 1,907,528 | A * | 5/1933 | Evans | A47J 27/0813 292/27 |
| 2,473,065 | A * | 6/1949 | Miller | E05C 9/06 292/37 |
| 2,664,611 | A * | 1/1954 | Shomber | F16B 5/10 24/642 |
| 2,729,089 | A * | 1/1956 | Pelcin | E05B 47/0002 70/151 R |
| 3,333,878 | A * | 8/1967 | Pelcin | E05C 9/043 292/37 |
| 3,362,740 | A * | 1/1968 | Burns | E05C 9/042 292/34 |
| 3,457,744 | A * | 7/1969 | Bisbing | E05C 9/047 292/7 |
| 3,884,515 | A * | 5/1975 | Ashkenazi | E05C 9/14 292/183 |
| 3,953,061 | A * | 4/1976 | Hansen | E05C 9/042 292/34 |
| 4,641,865 | A * | 2/1987 | Pastva | E05B 83/01 292/DIG. 57 |
| 4,892,338 | A * | 1/1990 | Weinerman | E05C 9/046 292/DIG. 31 |
| 4,973,091 | A * | 11/1990 | Paulson | E05C 9/042 292/216 |
| 5,263,346 | A * | 11/1993 | Sato | E05B 83/30 70/210 |
| 5,385,374 | A * | 1/1995 | Fann | E05B 55/005 292/351 |
| 5,484,178 | A * | 1/1996 | Sandhu | E05B 83/30 292/DIG. 31 |
| 5,632,166 | A * | 5/1997 | Wiersma | E05C 9/048 70/120 |
| 5,820,175 | A * | 10/1998 | Clavin | E05C 1/145 292/DIG. 31 |
| 5,983,682 | A * | 11/1999 | Parikh | E05B 5/00 292/DIG. 31 |
| 5,984,383 | A * | 11/1999 | Parikh | E05B 1/0092 292/216 |
| 6,543,821 | B1 * | 4/2003 | Weinerman | E05B 13/105 292/26 |
| 6,708,537 | B1 * | 3/2004 | Eschweiler | E05B 85/18 292/DIG. 31 |
| 7,182,203 | B2 * | 2/2007 | Burns | E05B 17/0041 220/326 |
| 7,237,812 | B2 * | 7/2007 | Tweedy | E05C 9/00 292/DIG. 31 |
| 7,398,664 | B1 * | 7/2008 | Weinerman | E05C 3/042 292/DIG. 31 |
| 7,454,933 | B1 * | 11/2008 | Paige | E05B 5/003 292/DIG. 31 |
| 7,775,564 | B2 * | 8/2010 | Moore | A01K 29/00 70/55 |
| 8,469,408 | B2 * | 6/2013 | Li | E05C 19/001 292/37 |
| D694,087 | S * | 11/2013 | Burns | D8/302 |
| 8,657,345 | B1 * | 2/2014 | Shih | E05B 63/0056 292/37 |
| 8,733,139 | B2 * | 5/2014 | Pickar | E05B 85/12 292/DIG. 31 |
| 9,399,879 | B2 * | 7/2016 | Burns | E05B 85/18 |
| 9,567,775 | B2 * | 2/2017 | Moore | E05C 9/043 |
| 11,492,824 | B2 * | 11/2022 | Flaute | B60R 7/06 |
| 11,501,990 | B2 * | 11/2022 | Matsutori | H01L 21/67346 |
| 2002/0171248 | A1 * | 11/2002 | Diss | E05B 83/30 292/164 |
| 2005/0006906 | A1 * | 1/2005 | Yamada | E05B 83/30 292/63 |
| 2005/0257582 | A1 * | 11/2005 | Minix | E05B 13/004 70/210 |
| 2006/0006664 | A1 * | 1/2006 | Pickar | E05B 85/18 292/167 |
| 2006/0279094 | A1 * | 12/2006 | Tweedy | E05C 9/06 292/336.3 |
| 2010/0300162 | A1 * | 12/2010 | Cappuccio | E05B 47/0607 70/257 |
| 2011/0126598 | A1 * | 6/2011 | Bacon | E05B 85/22 70/77 |
| 2012/0080890 | A1 * | 4/2012 | Loret De Mola | E05C 1/14 292/164 |
| 2012/0174633 | A1 * | 7/2012 | Bacon | E05B 85/22 70/77 |
| 2020/0063470 | A1 * | 2/2020 | Yalamati | E05C 1/14 |

\* cited by examiner

UNIVERSAL LATCH ASSEMBLY TO ALLOW SELECTIVE LATCH HANDLE ORIENTATIONS

CROSS-REFERENCE TO RELATED APPLICATIONS

This application is based on and claims domestic priority from U.S. Provisional Application Ser. No. 63/283,356 filed on Nov. 26, 2021, the entire contents of which are expressly incorporated hereinto by reference.

FIELD

The embodiments disclosed herein relate generally to latch assemblies for doors and drawers, especially interior doors, bins and drawers typically employed in aircraft cabins. In preferred embodiments, the latch assemblies disclosed herein are especially useful to allow selective latch paddle orientations relative to the orientation of the actuator/striker assembly that can be changed after installation of the latch assembly so as to accommodate the ergonomic preference of the user.

BACKGROUND

Current latches employed in certain interior aircraft cabin components, such as interior cabin doors, overhead storage bin doors, cabinet doors and drawers, are provided with latch assemblies which include an actuator/striker subassembly having a latch bolt operable so as to engage and disengage from an associated striker plate by a manually operable lever, push button or slider member. The actuator/striker subassembly is in general attached to the structural component that is movable (e.g., the user accessible face of the door, bin, drawer, cabinet or the like). In the locked (engaged) position, the striker of the latch bolt is held by the striker plate (which can often be a wire loop or a punched metal strip) which is attached to the non-movable component or frame associated with the door, bin, drawer or cabinet structure. Conventionally, the location of the latch bolt depends on the best structural integrity and/or available space. The striker placement is dependent on the latch bolt location. The orientation of the operating paddle lever or slider towards the user's hand depends on ergonomic requirements. To allow all the necessary structural elements to function properly together, there is a need to have latch variations (and thus various part numbers) to be used in various locations within the aircraft interior cabin with respectively various orientations of the paddle lever being thereby required.

It would therefore be highly desirable if a latch assembly was provided which allowed for multiple orientations of the paddle lever relative to the actuator/striker subassembly that would thereby reduce the need for varying different latch assembly components. It is towards fulfilling such a need that the embodiments disclosed herein are directed.

SUMMARY

Generally, the embodiments disclosed herein are directed toward latch assemblies adapted to releasably latch a movable component to a fixed component. According to some embodiments the latch assembly will include a paddle lever, a striker/latch subassembly and an actuator subassembly. The paddle lever is pivotally movable between latched and unlatched conditions by a manually applied pull force and includes a rearwardly protruding actuator flange. The striker/latch subassembly is provided with a strike plate defining a latch opening and a latch bolt having a latch stem and a latch pin extending forwardly from the latch stem.

The actuator subassembly operatively interconnects the paddle lever and the striker latch subassembly and includes (i) a closeout plate defining an arcuate guide slot, wherein the paddle lever is connected to the closeout plate to allow for manual pivotal movements between the latched and unlatched conditions thereof, and (ii) a rotary disc rotationally moveable relative to the closeout plate.

The rotary disc will preferably include a fixed actuator pin extending forwardly from the actuator plate so as to be operatively engaged with the actuator flange of the paddle lever when the paddle lever is manually rotated into the unlatched condition thereof. A circumferentially spaced apart set of arcuate spirally patterned cam slots is defined in the rotary disc. Each of the cam slots is adapted to receive the latch pin of the striker/latch subassembly and thereby define a respective orientation position of the paddle lever. Pivotal movement of the paddle lever from the latched condition into the unlatched condition responsively engages the actuator flange with the actuator pin to thereby cause rotation of the actuator plate and movement of the latch pin within a selected one of the cam slots whereby the latch bolt is retracted.

According to certain embodiments, the rotary disc defines diametrically opposed pairs of the cam slots that are circumferentially positioned 90° apart from one another to thereby respectively establish 0°, 90°, 180° and 270° orientations of the paddle lever.

The closeout plate may include a pair of separated bosses and a rod extending between and rotationally received by the bosses. The paddle lever may thus include a pair of separated lobes each connected to a respective terminal end portion of the rod to thereby mount the paddle lever to the closeout plate and allow pivotal movements of the paddle lever between the latched and unlatched conditions.

A recessed housing may be provided to house the actuator subassembly therein. The housing may also include a receiver for receiving the latch bolt of the striker/latch subassembly therein.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION OF EMBODIMENTS

Figure 1:
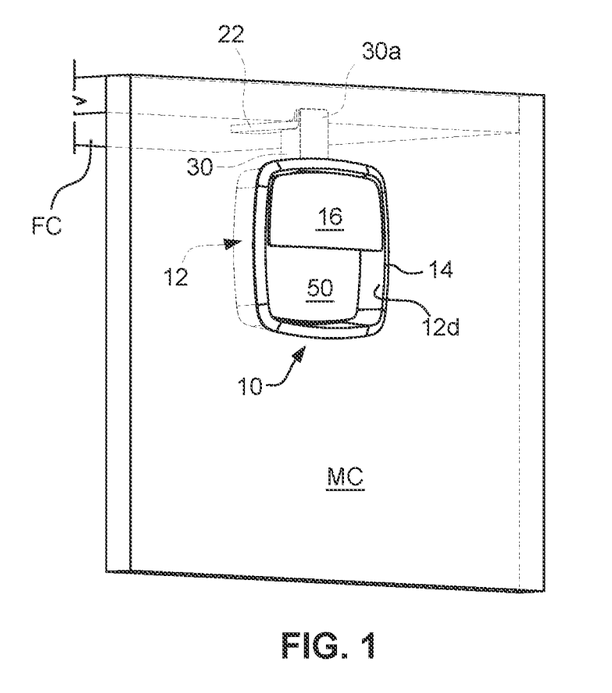
FIG. 1 is a front perspective view of a partial cabinet and cabinet door operatively provided with a latch assembly according to an embodiment of the present invention.
Figure 2:
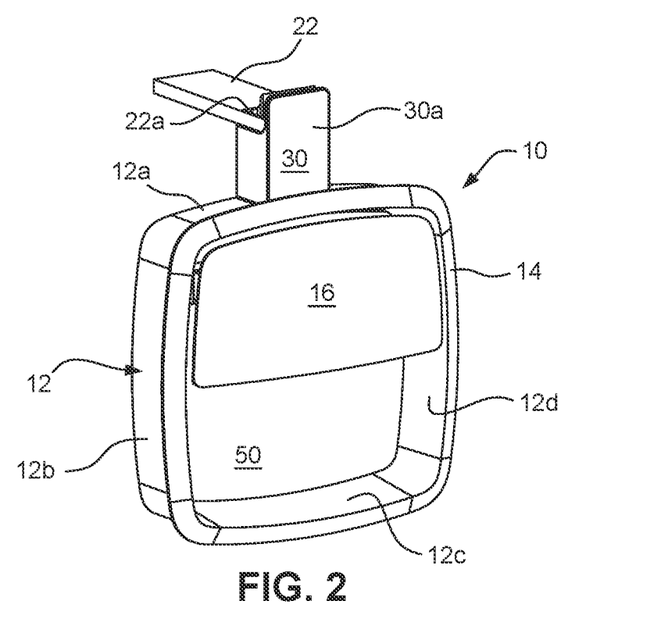
FIG. 2 is an enlarged perspective view of the latch assembly shown in FIG. 1 but disassociated from the surrounding cabinet structure for clarity of presentation.
Figure 3:
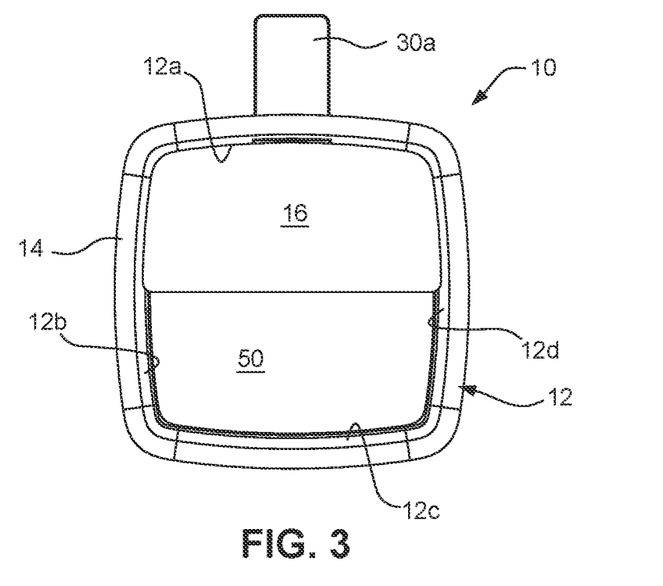
FIGS. 3 and 4 are front and rear elevational views of the latch assembly shown in FIG. 2.
Figure 4:
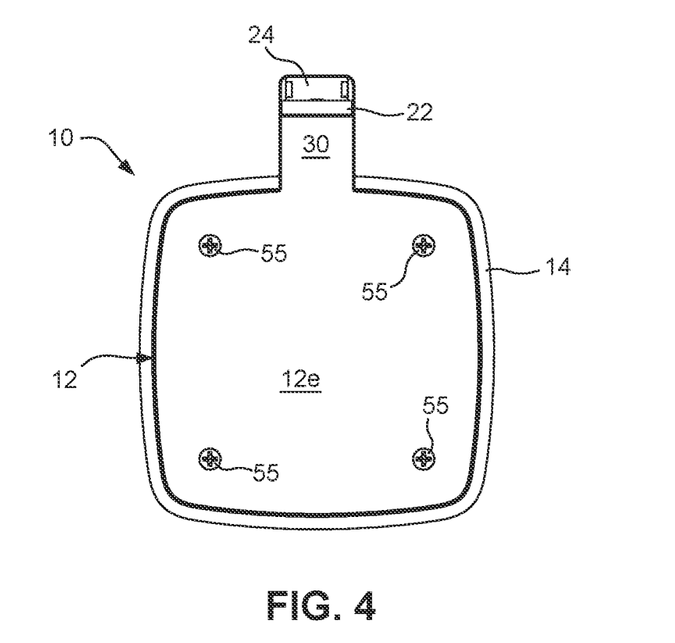
Figure 5:
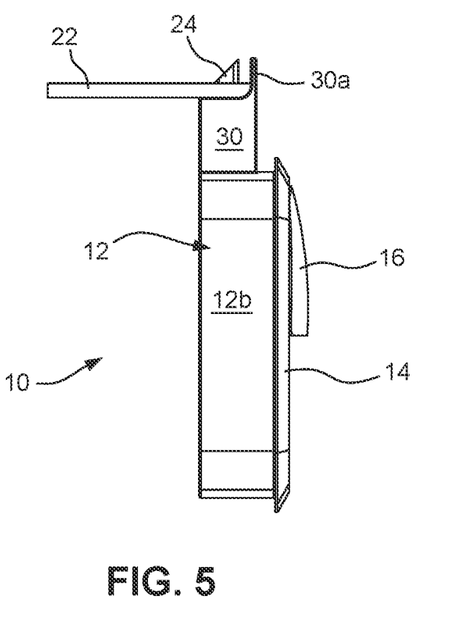
FIG. 5 is a left side elevational view of the latch assembly shown in FIG. 2, the right side elevational view being a mirror image thereof.
Figure 6:
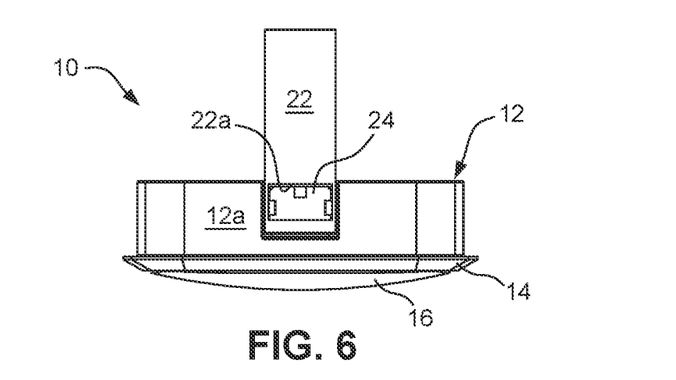
FIGS. 6 and 7 are top and bottom plan views of the latch assembly shown in FIG. 2.
Figure 7:
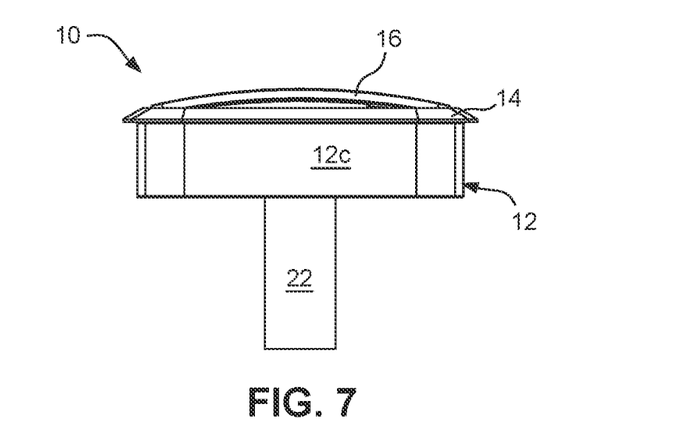

Accompanying FIG. 1 shows in a simplified schematic fashion a latch assembly 10 in accordance with an embodiment of the invention described herein operatively associated with and capable of releasably latching a moveable component MC relative to a fixed component FC. Those skilled in the art will recognize that the moveable component MC may be any one of an interior passenger door, cabinet door, drawer face, bin door and the like, while the fixed component FC will be a stationary structural member associated therewith, e.g., a frame or enclosure associated with such doors, drawers and the like.

As is shown in FIGS. 2-7, the latch assembly 10 includes a recessed housing 12 having a perimetrical bezel 14 at the forward edges of the opposed pairs of side walls 12a-12d. A paddle lever 16 is provided at a forward edge of the housing 12 and is sized and configured so as to occupy only a portion of the area bounded by the bezel 14 while a remaining area remains open thereby allowing access to the depth of the housing. A user may therefore manually grasp and forwardly pull the paddle lever 16 to unlatch the moveable component MC from the fixed component FC to thereby allow movement of the former relative to the latter.

Figure 8:
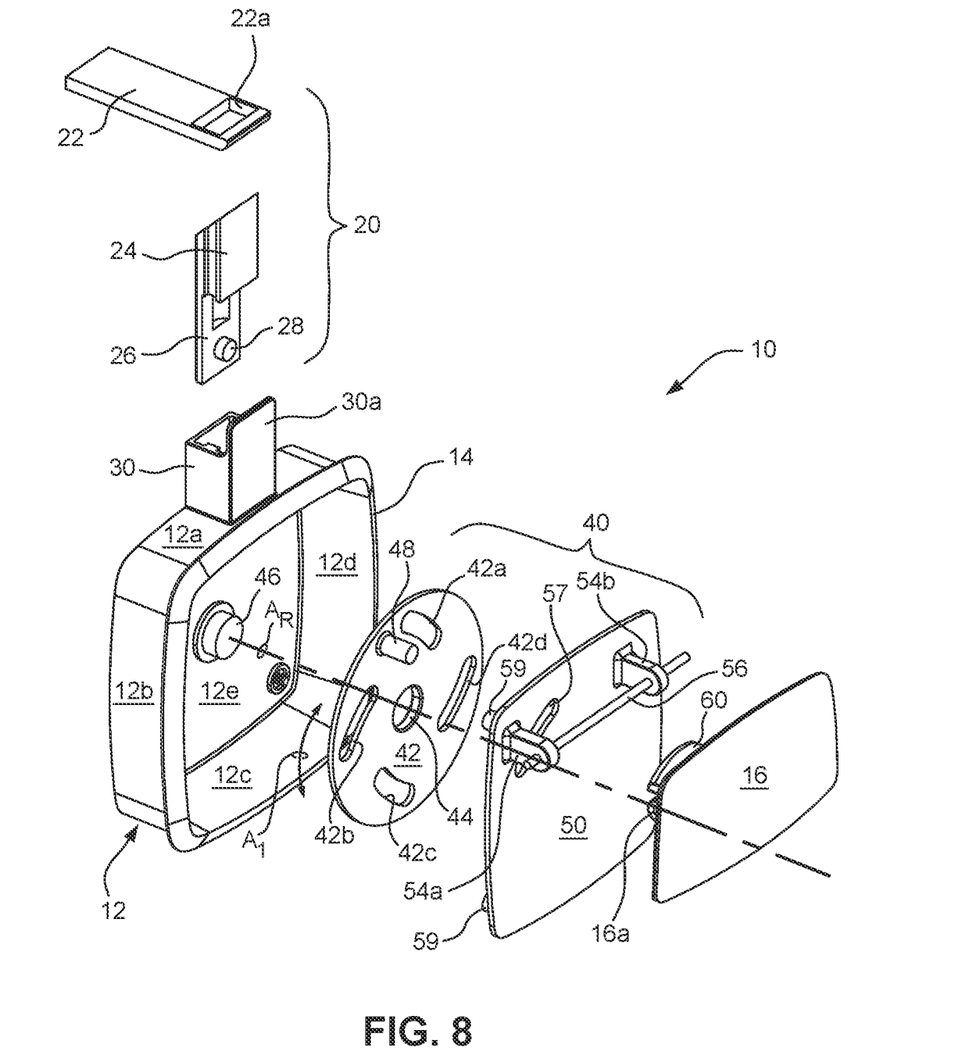
FIGS. 8 and 9 are front and rear exploded perspective views of the structural components associated with the latch assembly depicted in FIG. 1.
Figure 9:
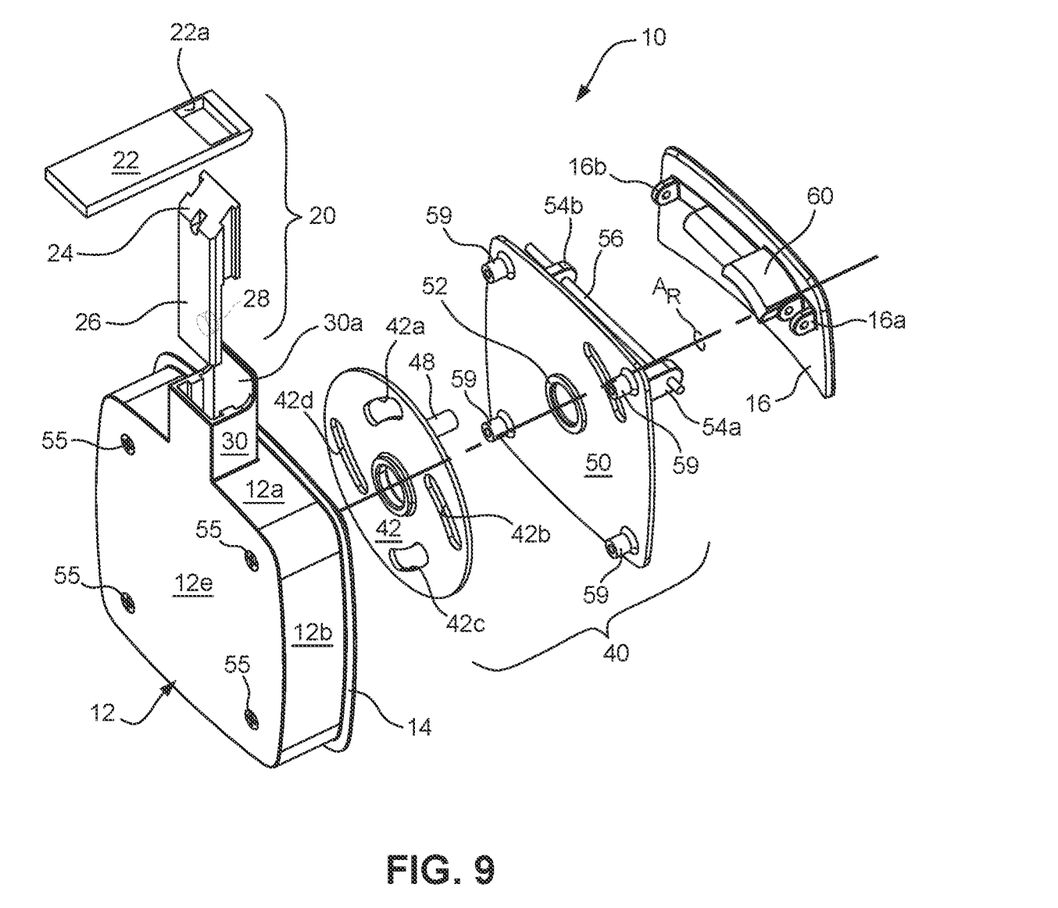
Figure 10A:
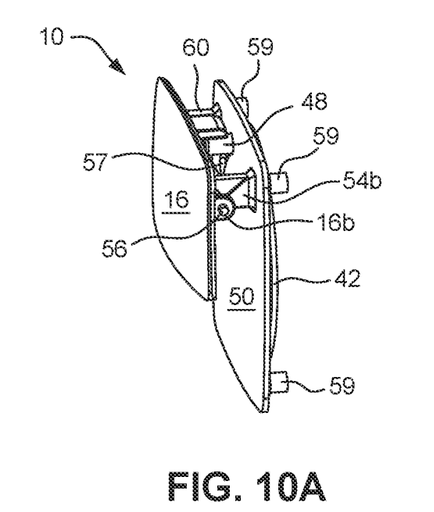
FIGS. 10A and 10B are front and rear perspective views of the manually operable paddle lever and the actuator subassembly components in a latched condition.
Figure 10B:
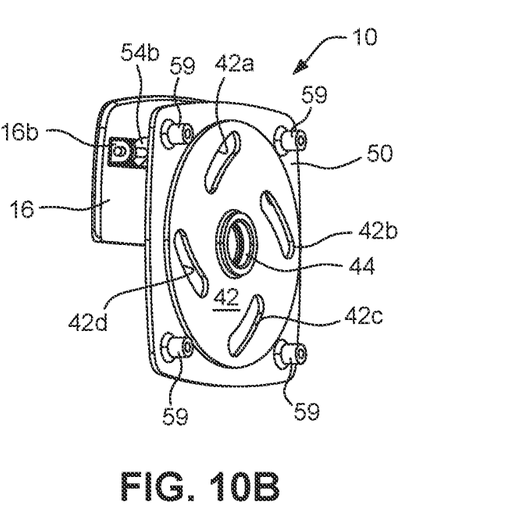
Figure 11A:
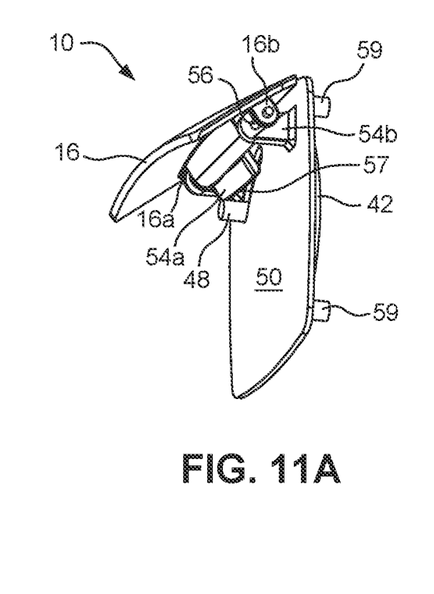
FIGS. 11A and 11B are front and rear views of the manually operable paddle lever and the actuator subassembly components in an unlatched condition.
Figure 11B:
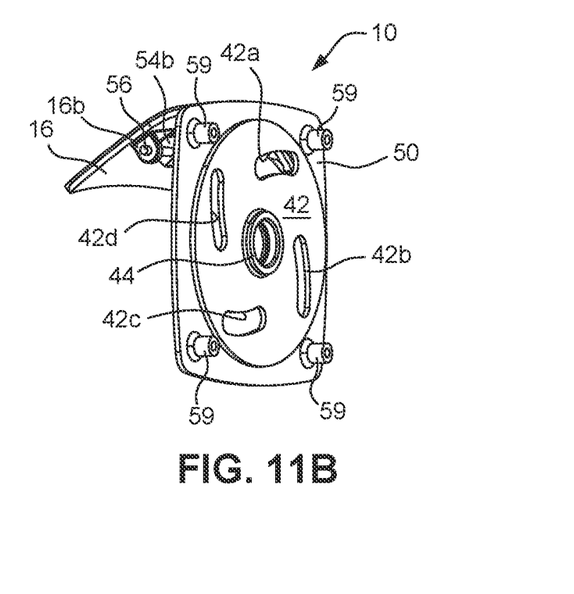

As is perhaps more clearly depicted in FIGS. 8-9, the latch assembly 10 will include a striker/latch subassembly 20 and an actuator subassembly 40 and operatively mounted to the housing 12. The striker/latch subassembly 20 is provided with a striker plate 22 adapted to being positionally fixed to the fixed component FC and defining a latch opening 22a adapted to receive therein the beveled upper end of the latch bolt 24 and thereby latch the movable component MC to the fixed component MC. A latch stem 26 extends downwardly from the latch bolt 24 and carries a forwardly projecting latch pin 28. The latch bolt 24 is slidably positioned within the rectangular tubular receiver 30 extending outwardly from the wall 12a of the housing 12. The receiver 30 includes a forward stop plate 30a adapted to contact the forward edge of the striker plate 22 when the moveable component MC is latched to the fixed component FC.

The actuator subassembly 40 includes a rotary slotted actuator disc 42 and a closeout panel 50. In the depicted embodiment, the actuator disc 42 is provided with a series of diametrically opposed pairs of arcuate spirally patterned cam slots 42a-42d each of which is adapted to receive therein the latch pin 28 associated with the latch stem 26. The cam slots 42a-42d are preferably circumferentially spaced apart from one another by about 90° to thereby respectively establish 0°, 90°, 180° and 270° positions of the paddle lever 16 as will be described hereinbelow. A central aperture 44 of the actuator disc 42 is adapted to receive therein a cylindrical pin 46 that protrudes forwardly from the back wall 12e of the housing 12. The forward end of the pin 46 is received within the cylindrical collar 52 formed on the back side of the closeout panel 50 (see FIG. 9). The actuator disc 42 is thereby capable of rotary movements (see arrow $A_1$ in FIG. 8) about the central axis defined by the cylindrical pin 46.

The closeout panel 50 is sized and configured so the perimetrical edges thereof are in close press-fit frictional engagement with the interior surfaces of the walls 12a-12d of the housing 12 to present a finished appearance to the latch assembly 10 and thereby visibly hide the rotary actuator disc 42. A separated pair of mounting bosses 54a, 54b receive a rod 56 therebetween. The rod 56 is in turn connected at each end which extends beyond the respective bosses 54a, 54b to a respective one of the separated lobes 16a, 16b (see FIG. 9) extending outwardly from a rear surface of the paddle lever 16. An arcuate guide slot 57 is formed in the closeout panel 50. A fixed actuator pin 48 protrudes outwardly from a forward face of the rotary actuator disc 42. The actuator pin 48 is located such that it extends through the guide slot 57 so the pin 48 is positioned near an uppermost end of the guide slot 57 when the latch assembly 10 is in a latched condition. The entire actuator subassembly 40 may be positionally attached to the housing 12 by means of machine or self-tapping screws 55 threadably connected to respective ones of the sockets 59 protruding from the back side corners of the closeout panel 50.

A fixed position actuator flange 60 extends rearwardly from the paddle lever 16 and is adapted to engage the actuator pin 48 extending through the guide slot 57 of the closeout panel 50. The rod 56 thereby allows the paddle lever 16 to be pivotally moved from a latched condition (whereby the paddle lever 16 is essentially coplanar with the bezel 14 of the housing 12) and an outward angulated unlatched condition (whereby the paddle lever 16 extends outwardly at an angle relative to the bezel 14 of the housing 12).

Figure 12A:
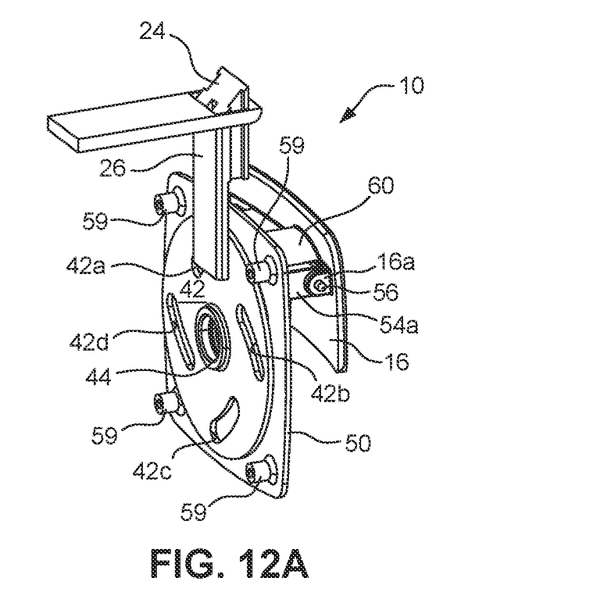
FIGS. 12A and 12B are rear perspective views of the paddle lever and actuator subassembly components operably associated with the striker/latch subassembly components in latched and unlatched conditions, respectively.
Figure 12B:
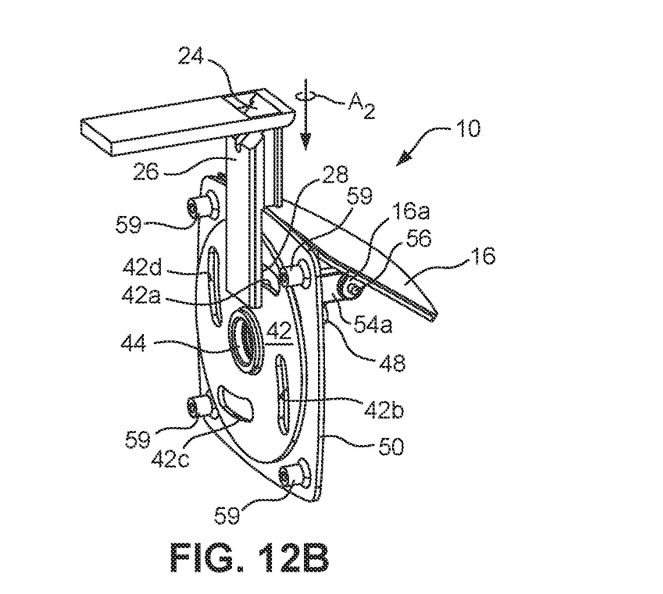

Accompanying FIGS. 10A-10B and 11A-11B show front and rear perspective views depicting the paddle lever 16 and its cooperative engagement with the actuator subassembly 40 in latched and unlatched conditions, respectively, while accompanying FIGS. 12A-12B depict the cooperative engagement between the actuator subassembly 40 and the striker/latch subassembly 20 during latched and unlatched conditions, respectively. With reference to such FIGS. 10A through 12B, it will be seen that exerting a manual pull force on the paddle lever 16 will cause the paddle lever 16 to pivot outwardly into an unlatched condition which in turn responsively to causes the actuator flange 60 to engage the actuator pin 48 extending through the guide slot 57 and thereby move the pin 48 along the guide slot 57 from an initial position near one end of the guide slot 57 towards an opposite end thereof. Movement of the pin 48 in such a manner will therefore responsively rotate the rotary actuator plate 42 in a counterclockwise direction about the axis $A_R$ as viewed from the front. At this time, assuming the paddle lever 16 is in a 0° orientation such that the latch pin 28 is operatively received within the slot 42a, the slot 42a will exert a cam force against the latch pin 28 thereby pulling the latch stem 26 and retracting the latch bolt 24 (i.e., in the direction of arrow $A_2$ shown in FIG. 12B) away from the opening 22a associated with the fixed position striker plate 22 thereby disengaging the latch bolt 24 from the striker plate 22. Once the latch bolt 24 is disengaged from the striker plate 22, the movable component MC may then be positionally moved relative to the fixed component FC. Returning the paddle lever 16 to the latched condition will reverse the movements described above, i.e., so as to rotate the actuator plate 42 in a clockwise direction (arrow $A_1$ in FIG. 8) about the rotation axis $A_R$ (see FIGS. 8 and 9) to responsively extend the latch bolt 24 (i.e., a direction opposite to arrow $A_2$ shown in FIG. 12B).

A suitable compression spring (not shown) may be positioned within the receiver 30 to exert a spring force against the latch bolt 24 in a direction opposite to arrow $A_2$ thereby biasing the bolt 24 into engagement with the strike plate 22. The beveled upper end of the latch bolt 24 will therefore allow engagement with the forward edge of the strike plate 22 causing the latch bolt 24 to be retracted into the receiver 30 against the bias force of the compression spring and then encouraged to be extended into engagement with the opening 22*a* upon alignment with the beveled end of the latch bolt 24. Such bias force will also urge the rotary disc 42 to be rotated in a counterclockwise direction (as viewed from the front) to assist in returning the paddle lever 16 to its normal state whereby the paddle lever 16 is essentially coplanar with the bezel 14 of the housing 12*a*.

Figure 13:
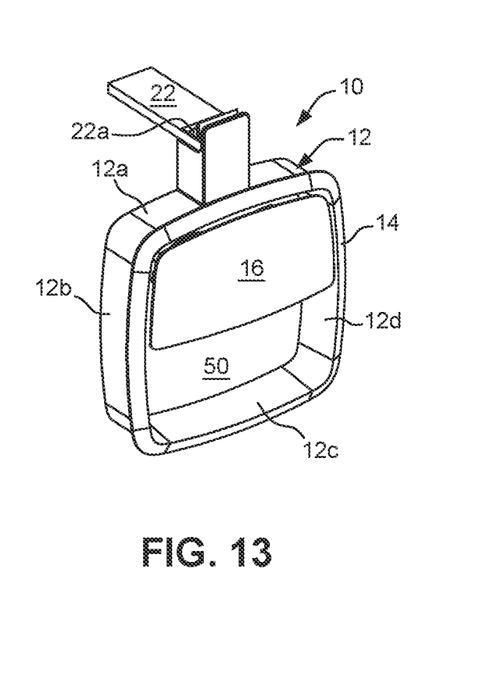
FIGS. 13-16 depict the possible user selectable orientations of the paddle lever in 0°, 90°, 180° and 270° positions as allowed by the latch subassembly positioning within the housing relative to the striker/latch subassembly.
Figure 14:
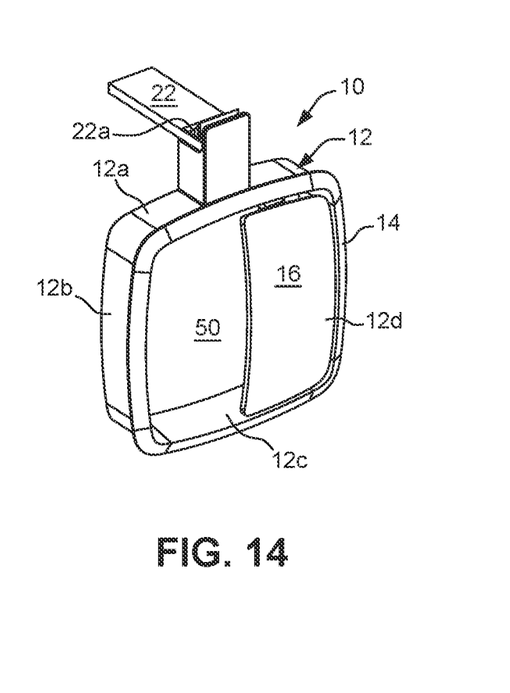
Figure 15:
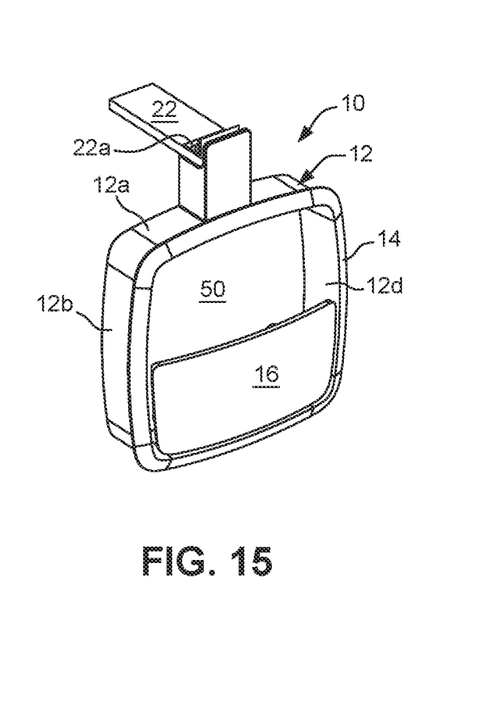
Figure 16:
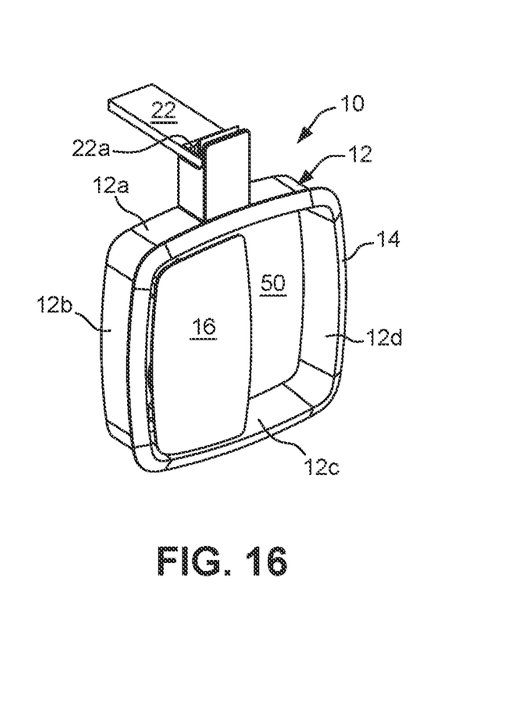

It will therefore be appreciated that the actuator subassembly 40 may be disassociated from the housing 12 by removal of the screws 55 and then pulling the entire subassembly 40 with the paddle lever 16 attached thereto out of rotary engagement with the back pin 46. Thereafter the entire subassembly 40 with the paddle lever 16 attached thereto may be rotated to align the latch pin 28 with a different one of the spirally patterned cam slots 42*a*-42*d*, following which the subassembly 40 may be re-associated operatively within the housing 12 and re-attached by means of the screws 55. In the embodiment depicted, alignment of the latch pin 28 with the slot 42*a* of the rotary disc 42 will position the paddle lever 16 in a 0° orientation as shown in FIG. 13; the alignment of the latch pin 28 with the slot 42*b* of the rotary disc 42 will position the paddle lever 16 in a 90° orientation as shown in FIG. 14; the alignment of the latch pin 28 with the slot 42*c* of the rotary disc 42 will position the paddle lever 16 in a 180° orientation as shown in FIG. 15; and the alignment of the latch pin 28 with the slot 42*d* of the rotary disc 42 will position the paddle lever 16 in a 270° orientation as shown in FIG. 16. Such selectable orientations thereby provide the latch assembly 10 with enhanced universal installation which will also accommodate user preferences.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A latch assembly adapted to releasably latch a movable component to a fixed component, the latch assembly comprising:
    a paddle lever having an outwardly extending actuator flange, the paddle lever being manually moveable between latched and unlatched conditions;
    a latch bolt which includes a latch pin; and
    a rotary actuator plate which is rotational about a central rotary axis, wherein the rotary actuator plate comprises:
    (i) a fixed actuator pin extending outwardly from the rotary actuator plate, the fixed actuator pin adapted to being operatively engaged with the actuator flange of the paddle lever when the paddle lever is manually moved into the unlatched condition thereof, and
    (ii) at least one pair of arcuate spirally patterned cam slots defined in the rotary actuator plate, wherein
    each of the arcuate spirally patterned cam slots is adapted to receive therein the latch pin of the latch bolt to thereby define a respective different orientation position of the paddle lever in dependence upon which one of the arcuate spirally patterned cam slots receives the latch pin, and wherein
    movement of the paddle lever from the latched condition into the unlatched condition responsively engages the actuator flange with the fixed actuator pin causing rotation of the actuator plate about the rotary axis thereof and movement of the latch pin within a selected one of the arcuate spirally patterned cam slots in which the latch pin of the latch bolt is received whereby the latch pin is retracted to unlatch the moveable component from the fixed component.

2. The latch assembly according to claim 1, wherein the at least one pair of arcuate spirally patterned cam slots comprises first and second diametrically opposed pairs of the arcuate spirally patterned cam slots, wherein each of the arcuate spirally patterned cam slots is circumferentially spaced apart from one another.

3. The latch assembly according to claim 2, wherein the each of the arcuate spirally patterned cam slots is circumferentially spaced apart by 90° relative to one another so as to thereby establish the respective orientation of the paddle lever as 0°, 90°, 180° and 270° orientations thereof.

4. The latch assembly according to claim 1, further comprising:
    a closeout plate fixedly positioned between the paddle lever and the rotary actuator plate, wherein
    the closeout plate defines an arcuate guide slot through which the fixed actuator pin extends to allow a terminal end portion of the fixed actuator pin to be engaged by the actuator flange of the paddle lever when moved into the unlatched condition thereof.

5. The latch assembly according to claim 4, wherein the paddle lever is pivotally connected to the closeout plate to allow pivotal movements thereof between the latched and unlatched conditions.

6. The latch assembly according to claim 5, wherein
    the closeout plate includes a pair of separated bosses and a rod extending between and rotationally received by the bosses, and wherein
    the paddle lever comprises a pair of separated lobes each connected to a respective terminal end portion of the rod to thereby mount the paddle lever to the closeout plate to allow pivotal movements of the paddle lever between the latched and unlatched conditions.

7. The latch assembly according to claim 4, further comprising a recessed housing for housing therein the rotary actuator plate and the closeout plate.

8. The latch assembly according to claim 7, wherein the housing includes a receiver for receiving therein the latch bolt.

9. The latch assembly according to claim 8, wherein the latch bolt includes a latch stem extending therefrom, wherein the latch pin extends outwardly from an end of the latch stem.

10. The latch assembly according to claim 1, further comprising a strike plate adapted to being positionally fixed to the fixed component, the strike plate defining a latch opening for receiving a terminal end of the latch bolt when in the latched condition.

11. A latch assembly comprising:

a paddle lever having a rearwardly extending actuator flange, the paddle lever being manually rotatable between latched and unlatched conditions;

a striker/latch subassembly which includes a strike plate defining a latch opening and a latch bolt having a latch stem and a latch pin extending forwardly from the latch stem; and an actuator subassembly operatively interconnecting the paddle lever and the striker/latch subassembly, wherein the actuator subassembly comprises:

(i) a closeout plate defining an arcuate guide slot, wherein the paddle lever is connected to the closeout plate to allow for manual pivotal movements between the latched and unlatched conditions thereof; and (ii) a rotary disc rotationally connected to the closeout plate to as to be rotationally moveable about a central rotary axis thereof, the rotary disc including:

(a) a fixed actuator pin extending forwardly from the rotary disc and being operatively engaged with the actuator flange of the paddle lever when the paddle lever is manually rotated into the unlatched condition thereof; and (b) a circumferentially spaced apart set of arcuate spirally patterned cam slots each adapted to receive the latch pin of the striker/latch subassembly and thereby define a respective different orientation position of the paddle lever, wherein pivotal movement of the paddle lever from the latched condition into the unlatched condition responsively engages the actuator flange with the fixed actuator pin to thereby cause rotation of the actuator plate about the rotary axis thereof and movement of the latch pin within a selected one of the arcuate spirally patterned cam slots in which the fixed actuator pins is received to thereby retract the latch bolt from the strike plate.

12. The latch assembly according to claim 11, wherein the rotary disc defines diametrically opposed pairs of the arcuate spirally patterned cam slots that are circumferentially positioned 90° apart from one another to thereby respectively establish 0°, 90°, 180° and 270° orientations of the paddle lever.

13. The latch assembly according to claim 11, wherein the closeout plate includes a pair of separated bosses and a rod extending between and rotationally received by the bosses, and wherein the paddle lever comprises a pair of separated lobes each connected to a respective terminal end portion of the rod to thereby mount the paddle lever to the closeout plate to allow pivotal movements of the paddle lever between the latched and unlatched conditions.

14. The latch assembly according to claim 11, further comprising a recessed housing for housing the actuator subassembly therein.

15. The latch assembly according to claim 14, wherein the housing includes a receiver for receiving the latch bolt therein.

* * * * *